United States Patent [19]
Lehmann

[11] 4,058,877
[45] Nov. 22, 1977

[54] DEFLECTION-CONTROLLED ROLL FOR THE PRESSURE TREATMENT OF MATERIALS IN WEB FORM

[75] Inventor: Rolf Lehmann, Mutschellen AG, Switzerland

[73] Assignee: Escher Wyss Limited, Zurich, Switzerland

[21] Appl. No.: 674,236

[22] Filed: Apr. 6, 1976

[30] Foreign Application Priority Data

Apr. 15, 1975 Switzerland .................. 4778/75

[51] Int. Cl.$^2$ .............................................. B21B 13/02
[52] U.S. Cl. ............................................... 29/116 AD
[58] Field of Search ..................... 29/116 AD, 113 AD

[56] References Cited

U.S. PATENT DOCUMENTS

| 3,119,324 | 1/1964 | Justus | 29/116 AD X |
|---|---|---|---|
| 3,336,648 | 8/1967 | Alexeff | 29/113 AD |
| 3,389,450 | 6/1968 | Robertson | 29/116 AD |
| 3,587,152 | 6/1971 | Hold | 29/116 AD |
| 3,665,572 | 5/1972 | Robertson | 29/116 AD X |
| 3,676,908 | 7/1972 | Wittler et al. | 29/116 AD X |
| 3,802,044 | 4/1974 | Spillmann et al. | 29/113 AD |

*Primary Examiner*—Alfred R. Guest
*Attorney, Agent, or Firm*—Pennie & Edmonds

[57] ABSTRACT

The deflection-controlled roll has a roll shell rotatable about a fixed beam with a plurality of hydraulic piston support devices along the roll for exerting support forces between the beam and the roll shell. The roll shell has weakened zones along its length for reducing the stiffness of the shell. The weakened zones may comprise grooves, circumferential rows of bores or tangential slots, corrugated annular inserts, etc. The weakened zones may be formed between annular portions of the roll shell aligned with the operating surfaces of the support devices. Preferably the support devices form hydrostatic support fluid layers between the operating surfaces and the roll shell. Lift-off support devices may be employed.

11 Claims, 9 Drawing Figures

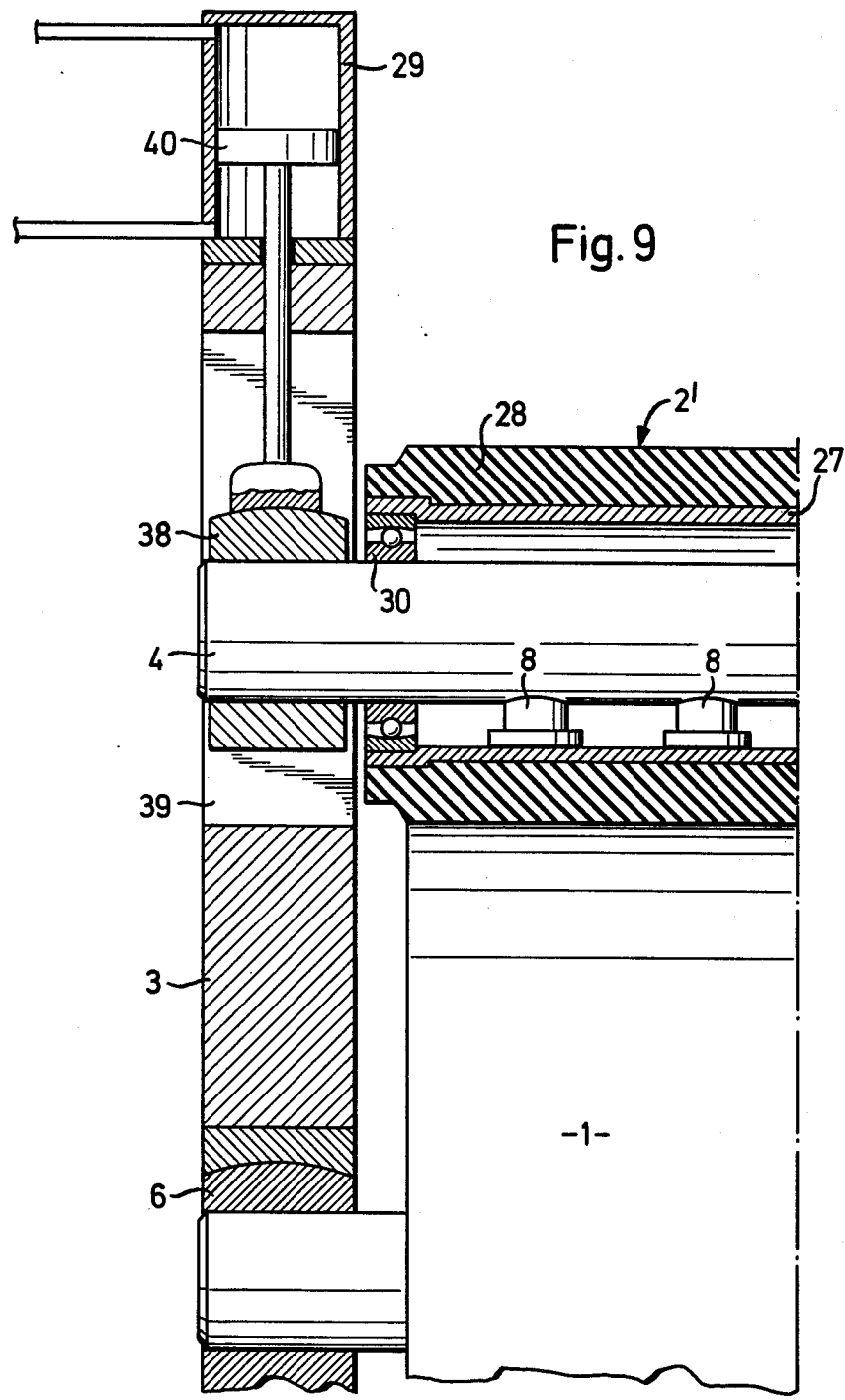

DEFLECTION-CONTROLLED ROLL FOR THE PRESSURE TREATMENT OF MATERIALS IN WEB FORM

This invention relates to a deflection-controlled roll for the pressure treatment of materials in web form comprising a fixed beam and a tubular roll shell which is rotatable about the beam. The roll shell is borne on running or operating surfaces of piston-like support devices exerting hydrostatic contact-pressure force, the roll shell being provided with a covering of elastomeric material.

Known rolls of this kind are used to press a web into contact with a co-acting or counter roll, or in general a counter member, as uniformly as possible. The contact-pressure or presser roll is prevented from sagging away from the co-acting counter roll and at the same time the roll shell is allowed to flex in the direction of the co-acting roll so as also to avoid the adverse effect of the co-acting roll sag.

However, there are cases in which the co-acting counter roll flexure or sag is such that a sag-compensating or deflection-controlled roll constructed in known manner can no longer follow it. On the other hand, there are also cases in which it is intentionally required not to press the roll uniformly in contact with the co-acting roll over its entire length, but only in certain zones. This is the case, for example, in rotary presses where relatively flexible plate cylinders are used and frequently the entire width of the plate cylinder is not used for printing purposes. The known sag-compensating rolls, whether those provided with a pressure chamber, for example, in accordance with German Pat. No. 1,411,327, or with hydrostatic support elements in accordance with U.S. Pat. No. 3,802,044, are much better than the previously used rolls without sag compensation, but they are not completely satisfactory for such purposes.

This invention relates to a further development of a sag-compensating roll according to U.S. Pat. No. 3,802,044, with the object of providing a roll which enables materials in web form to be pressed into contact with very flexible co-acting rolls, for example the said plate cylinders of rotary presses, and also allows contact pressures to be produced in selected zones of such a co-acting roll, while there is reduced contact pressure in other zones or, in some cases, the surfaces of the rolls are kept apart.

To this end, the roll according to the invention is characterized in that the roll barrel or shell is provided with weakened zones along its length by means of which its stiffness is reduced to lateral forces imposed thereon, as compared with the stiffness of a cylindrical tube of uniform wall-thickness. This results in a roll shell which is resilient to bending and which adapts much better to the co-acting roll than is the case with prior-art roll shells.

The weakened zones can be provided between annular portions of the roll shell which serve to form runways for the running surfaces of the support devices. That is, the weakened zones are positioned between annular portions of the roll shell aligned with the operating surfaces of the support devices. This construction divides the roll shell into cylindrical sections which have optimum properties for cooperation with the support devices while great flexibility is obtained by the zones between the cylindrical sections.

The weakened zones may comprise grooves extending substantially in the circumferential direction of the roll shell. The grooves are preferably annular, but the construction with grooves in the form of screwthreads is also possible. This gives weakened zones which are simple to produce at low cost.

The grooves may be formed on the outside of the roll barrel and have a corrugated profile, in which case they can be disposed continuously without regard to the operating or running surfaces of the support devices. Such a construction also has the advantage that the covering of elastomeric material adheres well to the shell since the adhesion surface is larger than in a smooth shell.

When the grooves are disposed between the annular portions of the roll shell which serve as runways, at least three grooves may be formed alternately in the inner surface and the outer surface of the shell so that a portion of U-shaped cross-section remains between them. This results in a very resilient simple construction, while retaining good running conditions for the support devices.

The weakened zones may be formed by annular inserts which have a smaller wall thickness than the rest of the roll shell and are of corrugated cross-section. This gives a very resilient construction which also has good running conditions for the support devices.

The weakened zones may be bores which are radial of the roll shell and the axes of which are situated in at least two planes at right angles to the roll shell axis, thus forming at least two circumferential axially-spaced rows of bores in the roll shell. The bores in adjacent planes or rows are offset from one another so that webs extending transversely of the axis of the roll shell remain between the bores. Here again the embodiment is easily produced with sufficient resilience.

The recesses may be tangential incisions or slots situated in planes at right angles to the axis of the roll shell, thus forming axially-spaced rows of crcumferentially-spaced tangential slots. The slots of adjacent planes or rows are advantageously offset from one another in the circumferential direction of the roll shell. This gives very high resilience of the roll shell in the axial direction.

For optimum utilization of the roll barrel resilience or flexibility, the support devices may be adapted to be connected to and disconnected from the pressure medium source individually and independently of one another, and the pressure to the devices adjusted independently. As a result, the contact-pressure along the roll can be controlled to extend either along the entire roll length or just over selected zones.

Preferably, the piston-like support devices have running or operating surfaces with means for forming hydrostatic support fluid layers, thereby allowing the roll shell to be borne on hydrostatically formed layers of the pressure medium. In this way, the roll shell is supported without direct contact on the running surfaces of the support devices to ensure minimum friction and wear between the running surfaces and the shell and permits compensation of some of the roll barrel sag in the region of the running surface. The arrangement is particularly advantageous if, as is the case with a shell having tangential incisions, the shell has openings into which the elastomeric material of the covering extends as far as the inner surface of the shell. In such case the portions of the inner surface of the shell which are in alignment with the operating surfaces of the support devices do not have good running properties, and the fluid support layers are highly advantageous.

In addition to the hydraulic support devices arranged in a row and acting as presser elements, hydraulic support devices acting as lift-off elements may be provided diametrically opposite the presser row. If these lift-off devices are actuated simultaneously with contact-pressure devices for certain portions of the roll, they can cause the roll shell to lift off in those zones where no contact pressure is required. Alternatively, if they extend upwardly, they can be used to lift the roll shell so that there is no need for a separate lifting or contact-pressure mechanism such as, for example, levers actuated by compressed-air cylinders.

Further details of the invention will be apparent from the following description of exemplified embodiments with reference to the accompanying drawings wherein:

FIG. 9 is an elevation, partially in section, of one end of a modification of the apparatus shown in FIG. 1 with a different roll end mounting.

Figure 1:
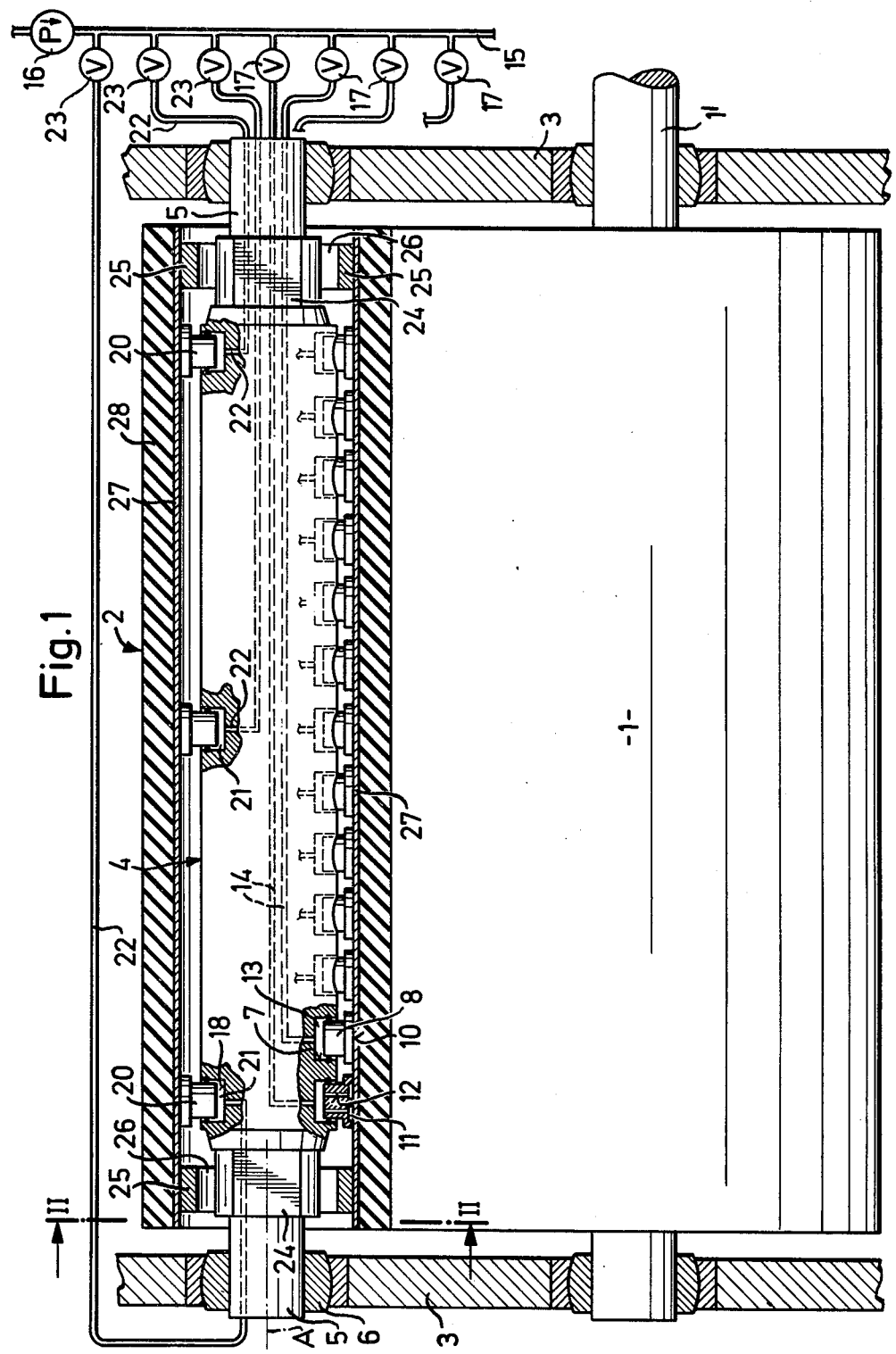
FIG. 1 is a diagrammatic partial section of a printing unit of a photogravure rotary press wherein a deflection-controlled roll according to the invention may be used as the contact-pressure or presser roll.

FIG. 1 diagrammatically illustrates a printing unit of a photgravure rotary press, said unit comprising an engraved plate cylinder 1 and a presser roll 2. Plate cylinder 1 is mounted rotatably in a housing 3 and can be driven via a shaft 1'. Presser roll 2 contains a fixed beam 4, the ends 5 of which are mounted in spherical bearing bushes 6 which allow the beam 4 to flex or sag. Beam 4 is prevented from rotating in housing 3 by means not shown in the drawing.

Beam 4 is formed with bores 7 for hydrostatic support elements 8 in the form of pistons disposed in a row along the contact-pressure line between the roll 2 and the plate cylinder 1. The piston-type support devices may be constructed in accordance with U.S. Pat. No. 3,802,044 and contain running or operating surfaces 10 in which hydrostatic bearing pockets 11 are formed which are connected to the cylinder chamber 13 of bore 7 via throttle bores 12. The cylinder chambers 13 of the cylinder bores 7 are connected via separate connecting lines 14 to the delivery line 15 of a pump 16 which delivers the hydraulic pressure medium for the hydrostatic support system provided by the support elements 8. The individual connecting lines 14 contain pressure control valves 17 which allow the pressure in the cylinder chambers 13 of the individual support elements 8 to be individually adjusted.

Roll 2 is also provided with cylinder bores 18 containing piston-like support elements 20 of the same construction as the support elements 8. Bores 18 have cylinder chambers 21 also connected to the delivery line 15 via connecting lines 22. The latter are provided with hydraulic control valves 23. The support elements 20 act as lift-off elements and are disposed diametrically opposite the elements 8 with respect to the roll axis A.

Figure 2:
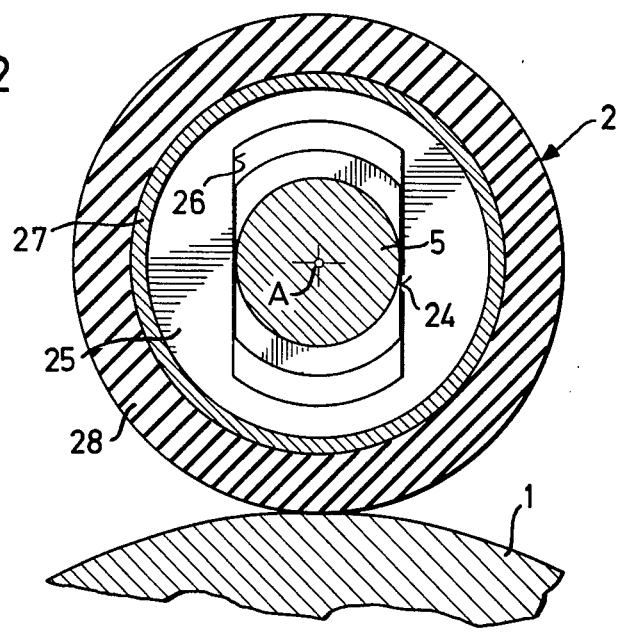
FIG. 2 is a section on the line II—II of FIG. 1.

As seen in FIGS. 1 and 2, guide surfaces 24 are formed at the ends of the beam 4 and guide rings 25 having elongated apertures 26 are guided at said surfaces 24. A roll shell 27 of a solid material, more particularly a metal, is mounted rotatably on the guide rings 25 and on the elements 8, 20. The elongated apertures 26 allow the ends of the roll shell to move laterally with respect to the beam under the guidance of surfaces 24, and under the control of pressure elements 8, 20. The roll shell 27 is provided with a coating 28 of rubber-like material.

In operation, the plate cylinder 1 rotates and as it does so transfers ink in known manner to a web of paper (not shown) moving between the plate cylinder 1 and the roll 2, the latter acting as a presser roll. The contact-pressure force between the roll 2 and the plate cylinder 1 is exerted by the support elements 8, while the force of each individual element can be freely selected by appropriate adjustment of the respective control valve 17. If contact pressure is required, for example, only in the middle of the cylinder, then the appropriate middle support elements 8 can be actuated. At the same time, the support elements 20 at the two ends of the roll 2 can be actuated to reduce or completely remove the contact-pressure force at the ends of the roll shell 27. In some cases these ends can be lifted off the plate cylinder 1. A movement of this kind is rendered possible by the lateral sliding of guide rings 25 on surfaces 24.

FIG. 1 does not show the weakening of the roll shell 27 in accordance with the invention, since the scale is too small for adequate illustration. Subsequent figures show various forms of weakening which may be employed in the roll 2 of FIG. 1.

Figure 3:
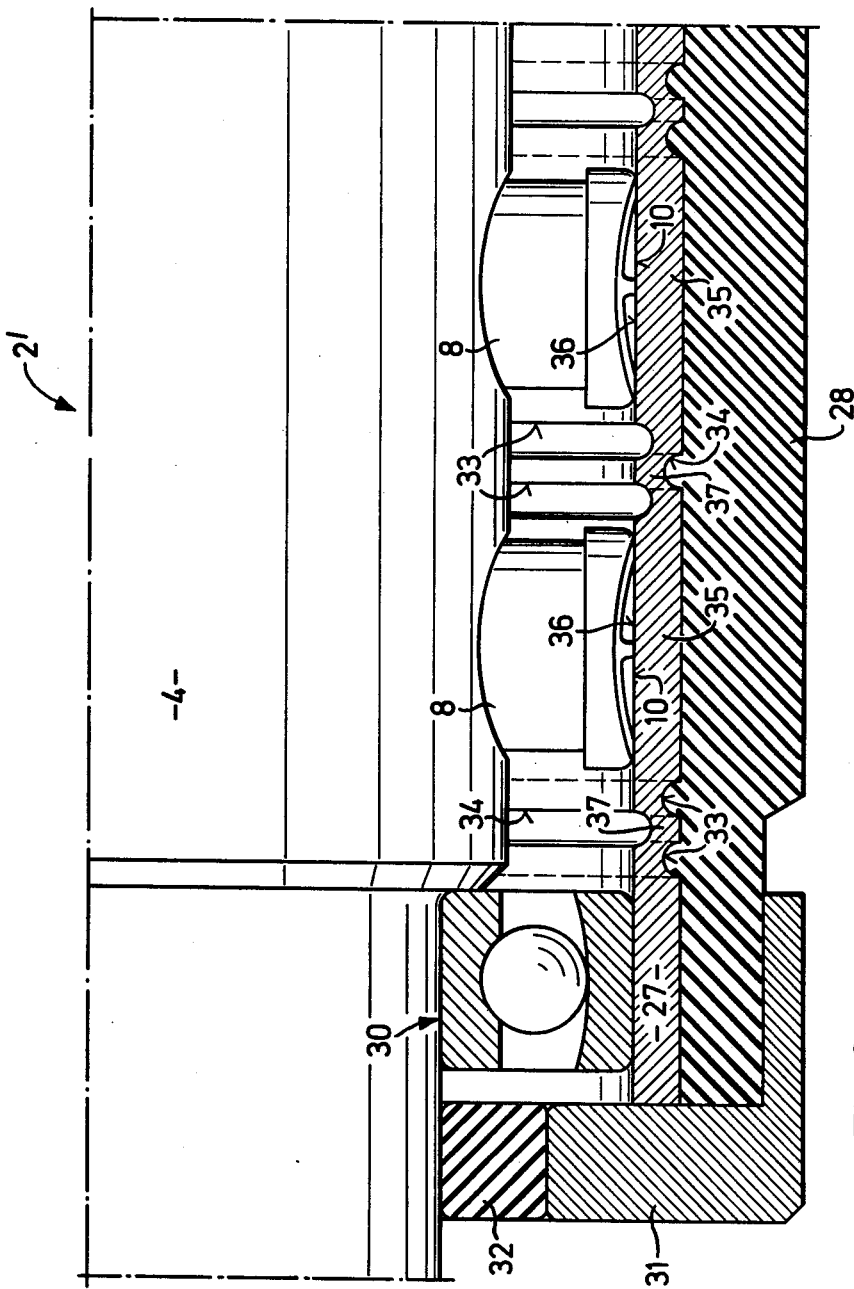
FIG. 3 is a partial section showing the left-hand end of another embodiment of a roll, including weakening means according to the invention.

FIG. 3 shows a modified support of the ends of the roll shell of FIG. 1. Here the guide ring 25 has been replaced by a rolling bearing 30 which rotatably mounts the ends of the roll shell 27 on the ends of the fixed beam 4. Thus there is no lateral movement of the shell ends with respect to the beam ends, as provided for in FIG. 1. The end of the roll shell 27 is closed by a closure ring 31 and a seal 32.

FIG. 3 shows one form of shell weakening which can be used in the embodiment of FIG. 1, as well as in this embodiment. The roll shell 27 is provided with grooves 33 and 34 extending in its circumferential direction. A set of three grooves 33, 34 is formed alternately in the inner and outer surfaces of the barrel 27 in longitudinally displaced relationship, so that a portion 37 of U-shaped cross-section remains between them. The grooves are situated in the zone between the support elements 8, and hence between the annular portions 36 of the roll shell which are aligned with the operating surfaces 10 of the support devices. Thus smooth inner surfaces of the roll shell are presented to the support devices.

In the embodiment shown in FIG. 3, the roll shell 27 with its covering 28 can be deformed according to requirements so as to obtain the required contact-pressure pattern on the counter roll 1 (FIG. 1). Unlike the embodiment according to FIG. 1, however, it is not possible to obtain a pressure movement of the entire roll shell by means of the support elements 8, because of the rolling bearing 30.

FIG. 9 shows an embodiment which allows overall movement of the roll by an external piston-cylinder mechanism. Cylinder 29 contains a piston 40 connected to element 38 which is guided in a guide 39 of the housing 3. By the action of its force on the end of beam 4, cylinder 29 enables roll 2' to be pressed against the co-acting roll 1 or to be lifted away from the co-acting roll. A similar mechanism is provided at the other end of the roll.

Figure 4:
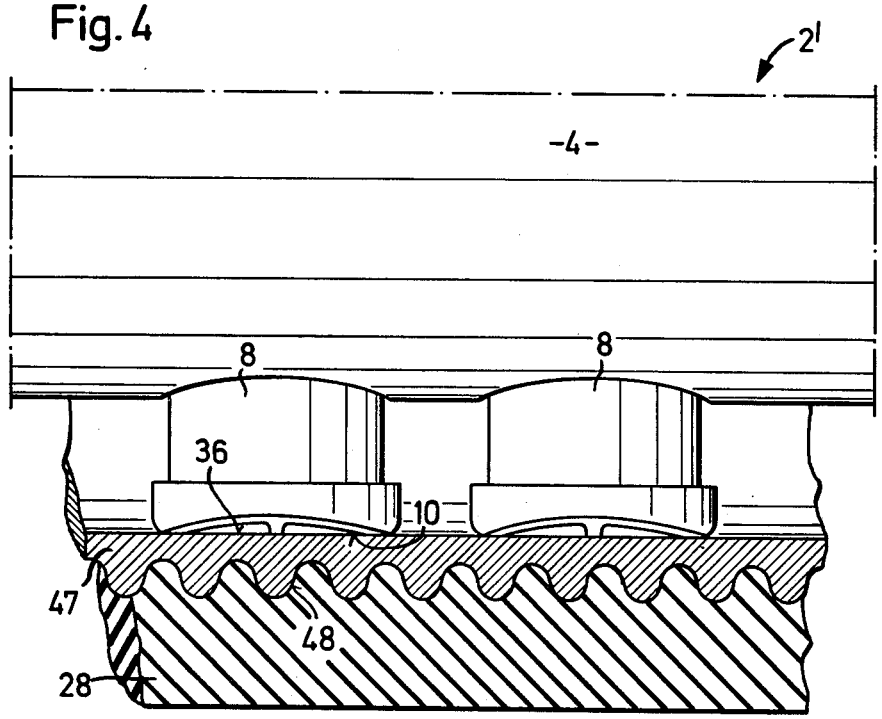
FIG. 4 is a partial section of another embodiment of a roll according to the invention.

FIG. 4 shows another embodiment of the presser roll. The roll shell may be guided at its ends as shown in FIG. 2 or mounted as shown in FIG. 3.

In FIG. 4 the outside of the roll shell 47 is provided with grooving 48 of corrugated profile. The roll shell is provided with a covering 28 of elastomeric material in the same way as in the embodiment of FIG. 3.

Figure 6:
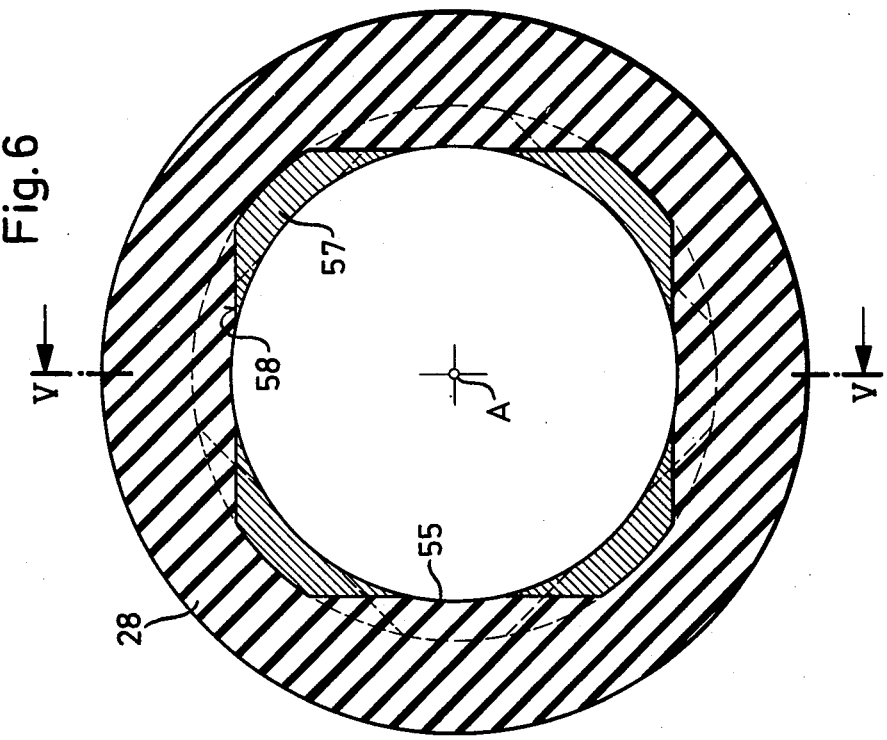
FIG. 6 is a section of the line VI—VI of FIG. 5.
Figure 5:
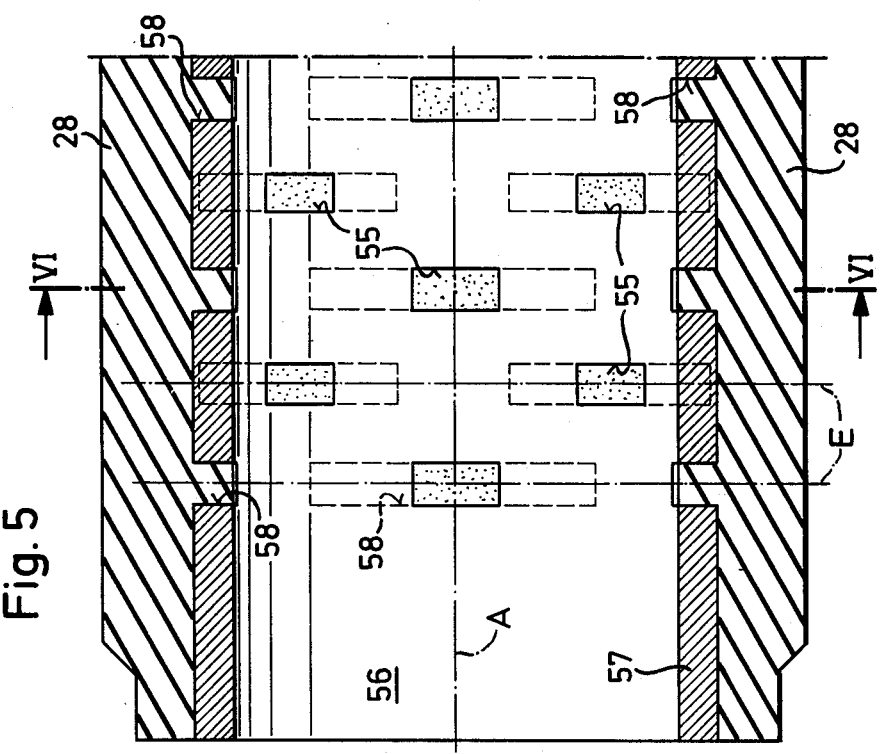
FIG. 5 is a partial section of one end of another embodiment of the shell of a roll according to the invention, taken on the line V—V of FIG. 6.

FIGS. 5 and 6 show cross-sections of the shell of another embodiment of the roll. Here the shell 57 has tangential incisions or slots 58 extending circumferentially and penetrating the wall of the shell to form apertures 55 therein. The incisions or slots 58 are offset from one another in the circumferential direction of the roll shell 57 in adjacent planes E at right angles to the axis of the shell, thereby forming axially-spaced rows of circumferentially spaced slots with the slots in adjacent rows offset to each other.

In the embodiment shown in FIGS. 5 and 6, the incisions 58 may be distributed as shown, i.e. uniformly along the length of the roll shell 57, possibly with the exception of an end 56 intended to receive the guide ring 25 or rolling bearing 30 (FIGS. 1 or 3). In such case the running surfaces 10 of the support elements 8 or of the elements 20 respectively move partly over the elastomeric covering material in the apertures 55. If, as is the case with hydrostatic fluid support of the roll shell 27 on the running surface 10, a film of liquid is maintained between the running surfaces and the shell, this circumstance does not cause any difficulty. However, if desired, similar to the embodiment of FIG. 3, the slots 58 may be made only in the zones between the support elements 8.

Figure 7:
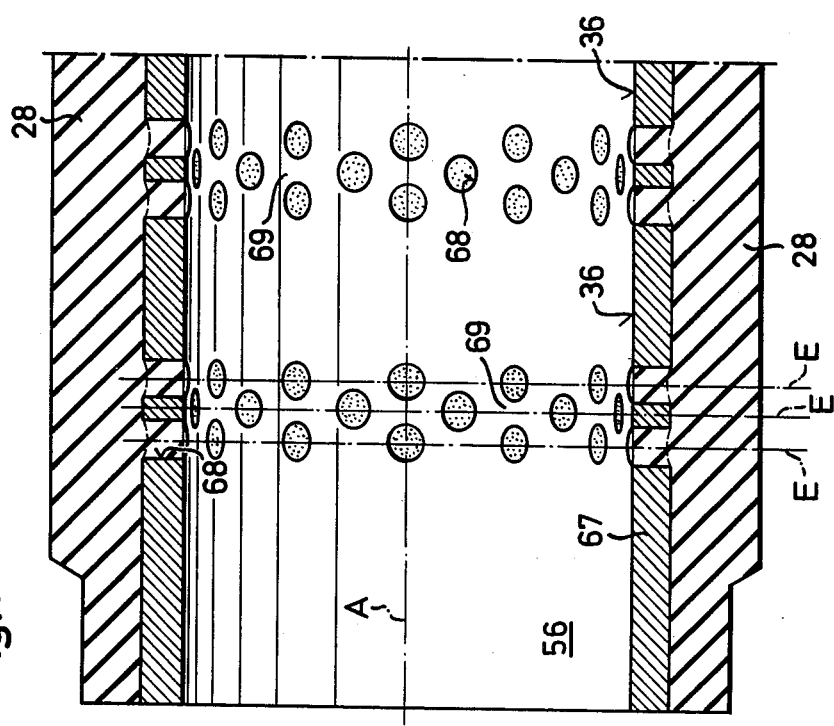
FIG. 7 is a partial section of the end of a roll shell of another embodiment.

FIG. 7 is a partial section of roll shell 67 in which the apertures are bores 68. The bores 68, as in the embodiment of FIG. 3, are disposed between running surfaces 36 aligned with the support elements 8. The bores are located with their axes in three planes E at right angles to the longitudinal axis A of the roll barrel 67, thereby forming three axially-spaced circumferential rows of bores. As in the embodiment of FIGS. 5 and 6, the bores 68 in adjacent planes or rows are offset from one another in the circumferential direction of the roll shell 67, so that webs 69 extending transversely of the axis A of the barrel 67 remain between them.

Figure 8:
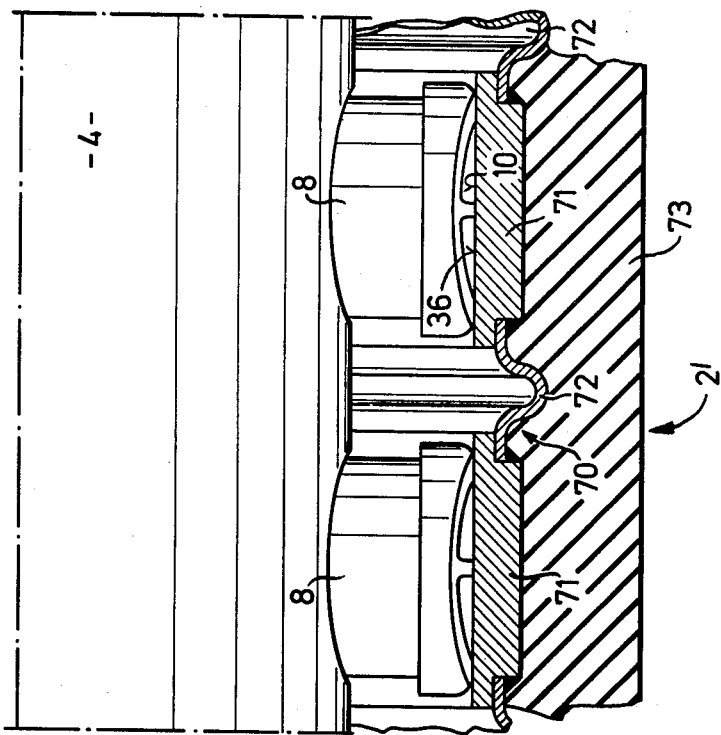
FIG. 8 is a partial section similar to FIG. 4 showing another embodiment of the roll.

Finally, FIG. 8 shows a roll with a shell 70 consisting of annular sections of rings 71 having running surfaces 36 for the support elements 8, and annular inserts 72 connecting the rings 71. The inserts 72 have a smaller wall thickness than the rings 71 and are of corrugated cross-section. They may be constructed after the style of corrugated tubes and be soldered or welded to the rings 71. A rubber covering 73 is formed on the roll shell formed by the rings 71 and the inserts 72.

I claim:

1. A deflection-controlled roll for the pressure treatment of materials in web form comprising a fixed beam, a continuous cylindrical roll shell rotatable about the beam, an elastomeric covering on the roll shell and a plurality of hydraulic piston support devices positioned along the length of the roll for exerting support forces between the beam and the roll shell at respective operating surfaces of the devices, said roll shell having annular portions with smooth inner surfaces aligned with and forming runways for said operating surfaces of said support devices and circumferential zones spaced along the length thereof between said annular portions of greater flexibility than said annular portions for reducing the stiffness of the shell to lateral forces imposed thereon during operation.

2. A roll according to claim 1 in which said flexible zones include circumferential grooves in the roll shell.

3. A roll according to claim 2 in which said grooves are on the outside of said roll shell.

4. A roll according to claim 1 in which the flexible zones between said annular portions of the roll shell include at least three grooves alternately on the outside and on the inside of the roll shell in longitudinally displaced relationship.

5. A roll according to claim 1 in which said flexible zones are formed by annular inserts between said annular portions and joined thereto, said annular inserts having a smaller wall thickness than the annular portions and having a corrugated cross-section.

6. A roll according to claim 1 in which said flexible zones between said annular portions include at least two circumferential axially-spaced rows of bores in the roll shell, the bores in adjacent rows being circumferentially offset with respect to each other.

7. A roll according to claim 1 in which said flexible zones include a plurality of circumferential axial-spaced rows of bores in the roll shell, the bores in adjacent rows being circumferentially offset with respect to each other, said elastomeric covering having portions filling said bores.

8. A roll according to claim 1 in which said flexible zones include a plurality of axially-spaced rows of circumferentially-spaced tangential slots in the roll shell, the slots in adjacent rows being circumferentially offset with respect to each other.

9. A roll according to claim 1 including means for supplying fluid under pressure independently to a plurality of said devices.

10. A roll according to claim 1 in which said hydraulic piston support devices include means for forming hydrostatic support fluid layers between said operating surfaces and the roll shell.

11. A roll according to claim 1 in which said plurality of hydraulic piston support devices are arranged in a row along the length of the roll for exerting pressure between the roll shell and a counter member, and including a plurality of hydraulic piston support devices spaced along the length of the roll diametrically opposite said row for exerting lift-off forces on the roll shell with respect to said counter member.

* * * * *